Jan. 5, 1960 G. W. SCHOSSOW 2,920,178
METHOD AND APPARATUS FOR PRODUCING THERAPEUTIC VAPORS
Filed May 3, 1957
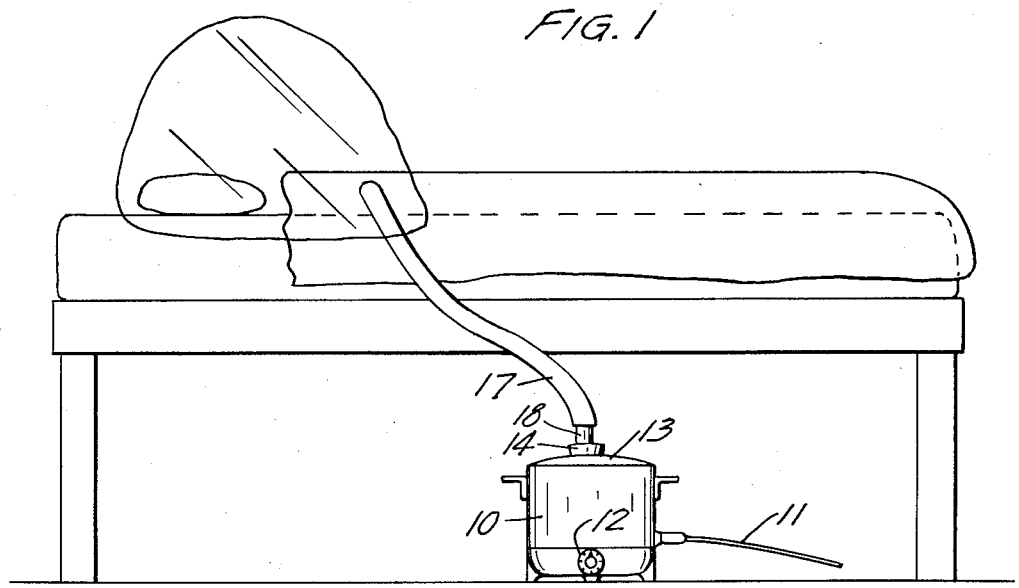
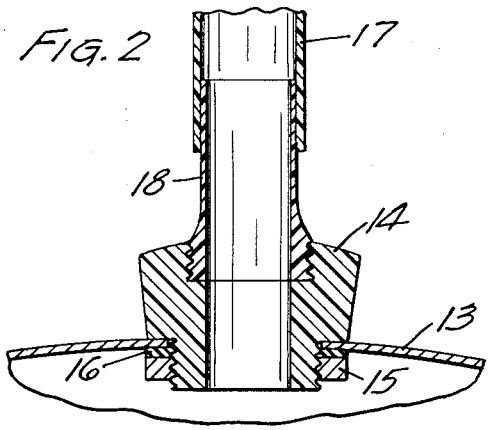
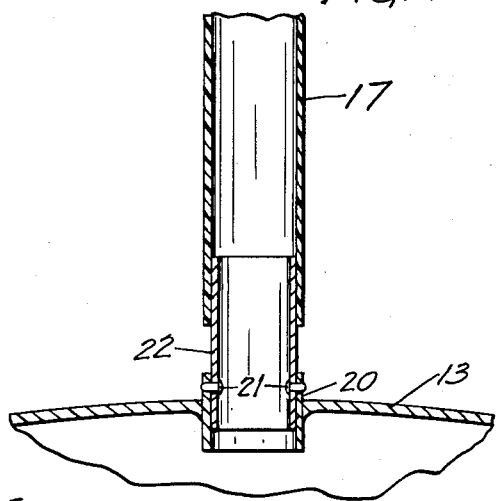
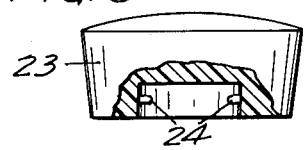
INVENTOR.
GEORGE W. SCHOSSOW
BY
Williamson, Schroeder, Adams & Meyers
ATTORNEYS United States Patent Office 2,920,178
Patented Jan. 5, 1960

2,920,178

METHOD AND APPARATUS FOR PRODUCING THERAPEUTIC VAPORS

George William Schossow, Erskine, Minn.

Application May 3, 1957, Serial No. 656,961

5 Claims. (Cl. 219—38)

This invention relates generally to a method and apparatus for producing therapeutic vapors, and more particularly to an invention wherein the rate at which said vapors are produced can be substantially controlled.

In the past, therapeutic steamers for producing vapors have been constructed which are relatively expensive and which have no means whatever for controlling the rate at which the steam is produced.

It is, therefore, a general object of my invention to provide a therapeutic steamer particularly constructed to control the rate at which the steam vapors are produced in order to obtain optimum results therefrom.

It is another object to provide a method of producing therapeutic vapors wherein the rate at which said vapors are produced are varied by controlling the temperature of the heating element producing the vapors.

More specifically, it is an object to provide a thermostatically controlled cooking vessel having means for converting the same to a thermostatically controlled therapeutic steamer.

Still more specifically, it is an object to provide a cooking vessel having a removable plug in the cover thereof for attachment of a conduit to carry the vapors to a remote location.

These and other objects and advantages of my invention will more fully appear from the following description, made in connection with the accompanying drawings, wherein like reference characters refer to the same or similar parts throughout the several views, and in which:

Fig. 1 is a side elevational view showing my therapeutic steamer in operative position alongside the bed of a patient;

Fig. 2 is a fragmentary vertical sectional view showing the connection of the steam conveying conduit with the cover of the vessel;

Fig. 3 is a removable plug member for the cover to facilitate use thereof as a cooking vessel;

Fig. 4 is a fragmentary vertical sectional view showing an alternative form of the connection between the cover opening and the steam conveying conduit;

Fig. 5 is an elevational view of the cover opening of the form shown in Fig. 4; and Fig. 6 is a front elevational view of an alternative form of plug for use with the form of the invention illustrated in Fig. 4.

As illustrated in the accompanying drawing I provide a cooking vessel such as the electrically heated deep frying unit designated as an entirety by the numeral 10. The cooking vessel has an electric supply cord 11 and a thermostatic control knob and indicating dial assembly 12 which controls the temperature of the contents of the vessel by an adjustable thermostat (not shown) which is connected with said control knob and controls the supply of electricity to the heating element (not shown) which supplies heat to the contents of the vessel 10. A cover for the vessel designated by the numeral 13 is provided, and in the form shown said cover has a centrally disposed opening formed therein.

In form A of my invention illustrated in Figs. 1, 2 and 3 an adapter member 14 is fixed in said opening as by a large flange nut 15 best shown in Fig. 2. A gasket 16 may be provided to seal the connection between the adapter member 14 and the surrounding portion of the cover 10. In Fig. 2 a vapor confining and conveying conduit 17 is connected with the upper portion of the adapter member 14 as by the sleeve type coupling member 18 which is received within the lower portion of the conduit 17. The lower end of the sleeve member 18 is enlarged somewhat and is threadably connected with the upper portion of the adapter member 14 which is also cooperatively threaded as best shown in Fig. 2. The coupling 18 may be removed by unscrewing the same from the adapter member 14 and a plug member 19 best shown in Fig. 3 may replace the same to provide a closed cover for the vessel 10 when using the same for cooking purposes.

An alternative form of my invention designated by the letter "B" is shown in Figs. 4, 5 and 6 wherein a sleeve member 20 is rigidly secured to the central opening in the cover 13 as by being welded thereto and said sleeve extends upwardly above the cover 13 best shown in Figs. 4 and 5. This upwardly extended portion is provided with a pair of opposed bayonet type slots 20a to receive attachment pins 21 which are carried by a connector sleeve 22 as best shown in Fig. 4. The sleeve 22 serves to interconnect vapor conveying conduit 17 with the cover sleeve 20. A cap member 23 may be provided with internally projecting pins 24 which are similarly received in said bayonet slots 20a when the sleeve 22 has been removed therefrom. This provides a closure for the cover opening to permit the same to be used with the vessel when the same is being used for cooking purposes.

It should be noted in both forms A and B of this invention that the conduit 17 may extend from the steamer to deliver the steam vapors into a confined area such as the tent illustrated in Fig. 1. Within such a confined area the control of the rate at which the steam vapors are produced becomes more important since it is apparent that extremely high humidity can be quickly produced within such a limited covered area.

It will be seen that by providing the thermostatically controlled heating element that the quantity of steam vapor produced in the vessel 10 can be varied in accordance with the desires of the operator. In other words, large quantities of steam may be supplied or only moderate quantities of steam can be produced depending upon the setting of the control knob and dial assembly 12. Previously, therapeutic steamers have produced steam vapors at only one rate and could not be controlled in any way. Obviously my invention not only provides means for controlling the rate at which the steam vapors are produced, but also provides a relatively inexpensive conversion unit for a conventional thermostatically controlled electric cooking vessel. It should be pointed out that the thermostat will automatically prevent the heating element from burning out in the event that the steamer boils dry and thus serves as a safety feature without requiring any additional attachments or connections.

In both forms of this invention, the cover member 13 merely rests on the top of the cooking vessel 10 and no hold-down or locking means are provided therefor. This prevents any substantial pressure from building up within the vessel 10 during the operation thereof as a therapeutic steamer. The plug members in both forms of my invention have the multiple purpose of serving as a gripping knob or handle for the cover 13, and serving as a connector for the vessel carrying conduit 17. The removable plug member in both forms of the invention permits easy conversion of the cover from a closure when the vessel 10 is being used for cooking purposes into a therapeutic steamer as described.

It will, of course, be understood that various changes may be made in the form, details, arrangement and proportions of the parts without departing from the scope of my invention which consists of the matter shown and described herein and set forth in the appended claims.

What I claim is:

1. A therapeutic steamer comprising a vessel for confining liquid therein, a heating element associated with said vessel for heating the liquid confined therein, adjustable thermostatic means controllably varying said heating element to maintain the same at a substantially constant controlled temperature to control the rate of evaporation of the liquid, and an unsecured cover closing said vessel but preventing appreciable pressure from being developed within said vessel as a result of steam being generated therein.

2. The structure set forth in claim 1 and a cover on said vessel with an opening therein to provide a localized vapor discharge from said vessel.

3. The strtucture set forth in claim 2 and a vapor conveying conduit connected with said opening for carrying the steam to a location remotely disposed from said vessel.

4. The structure set forth in claim 3 and said conduit having a readily removable connection with said cover.

5. A specially constructed thermostatically controlled cooking vessel particularly arranged for easy conversion to a therapeutic steamer, said vessel comprising a cooking chamber, a heating element for supplying heat to said chamber, an unsecured cover for the top of said chamber held in place only by the weight thereof, gripping means provided on said cover to facilitate removal thereof and defining a discharge opening therethrough, and a removable closure in said opening to permit discharge of therapeutic vapors produced in said chamber through said opening when said closure is removed therefrom.

References Cited in the file of this patent

UNITED STATES PATENTS

| | | |
|---|---|---|
| 1,930,551 | Blashfield | Oct. 17, 1933 |
| 2,013,914 | Hartmann | Sept. 10, 1935 |
| 2,096,023 | Albertson | Oct. 19, 1937 |
| 2,194,117 | Graham | Mar. 19, 1940 |
| 2,259,545 | Black | Oct. 21, 1941 |
| 2,259,712 | Sweetland | Oct. 21, 1941 |
| 2,277,895 | Willat | Mar. 31, 1942 |
| 2,480,337 | Pearce | Aug. 30, 1949 |
| 2,515,879 | Korn | July 18, 1950 |
| 2,560,349 | Inglis | July 10, 1951 |
| 2,611,070 | Chandler | Sept. 16, 1952 |
| 2,639,365 | Krampe et al. | May 19, 1953 |

FOREIGN PATENTS

| | | |
|---|---|---|
| 626,850 | Great Britain | July 22, 1949 |